United States Patent
Clausen (10) Patent No.: US 6,749,061 B2
(45) Date of Patent: Jun. 15, 2004

(54) COMPACT DISC CARRYING CONTAINER

(75) Inventor: Eivind Clausen, Bellingham, WA (US)

(73) Assignee: Allsop, Inc., Bellingham, WA (US)

( * ) Notice: Subject to any disclaimer, the term of this patent is extended or adjusted under 35 U.S.C. 154(b) by 4 days.

(21) Appl. No.: 09/938,769

(22) Filed: Aug. 23, 2001

(65) Prior Publication Data

US 2003/0038045 A1 Feb. 27, 2003

Related U.S. Application Data (60) Provisional application No. 60/227,430, filed on Aug. 23, 2000.

(51) Int. Cl.[7] .............................................. B65D 85/57
(52) U.S. Cl. ..................... 206/308.1; 206/311; 220/839; 402/4
(58) Field of Search .............................. 206/308.1, 311; 220/810, 839; 402/4, 79

(56) References Cited

U.S. PATENT DOCUMENTS

| | | | |
|---|---|---|---|
| 1,186,312 A | * | 6/1916 | Hanselmann ................ 206/311 |
| 1,459,457 A | * | 6/1923 | Wilburger .................... 206/311 |
| 2,625,935 A | * | 1/1953 | Marano ........................ 206/311 |
| 3,547,342 A | | 12/1970 | Smith et al. |
| D238,111 S | | 12/1975 | Shyers |
| D257,080 S | | 9/1980 | Schmidt |
| D260,454 S | | 9/1981 | Pepicelli, Jr. et al. |
| 4,387,807 A | | 6/1983 | de la Rosa |
| D288,983 S | | 3/1987 | Juhas et al. |
| D295,573 S | | 5/1988 | Williams |
| 4,838,709 A | | 6/1989 | Guerriero et al. |
| 4,974,740 A | | 12/1990 | Niles et al. |
| 5,011,010 A | | 4/1991 | Francis et al. |
| 5,248,032 A | | 9/1993 | Sheu et al. |
| 5,297,672 A | | 3/1994 | MacTavish |
| D347,728 S | | 6/1994 | Taniyama |
| 5,322,162 A | | 6/1994 | Melk |
| 5,396,987 A | | 3/1995 | Temple et al. |
| 5,450,953 A | | 9/1995 | Reisman |
| D371,482 S | | 7/1996 | Cole, Sr. |
| 5,535,884 A | | 7/1996 | Scott et al. |
| 5,556,683 A | | 9/1996 | Ranalli |
| D377,434 S | | 1/1997 | Hammond |
| 5,609,249 A | | 3/1997 | Cheng |
| 5,620,271 A | | 4/1997 | Bergh et al. |

(List continued on next page.)

OTHER PUBLICATIONS

*Computer Accessories—Consumer Electronics*, Allsop Product Catalog, Bellingham, WA, Jan., 1998, p. 9.
*Product Catalog*, Allsop, Inc., Bellingham, WA, 1999, pp. 17 and 27.
*Storage—Transportable*, 1999 Proprietary Study, Allsop, Inc., Bellingham, WA, 1999, 1 page.

*Primary Examiner*—Jim Foster
(74) *Attorney, Agent, or Firm*—Christensen O'Connor Johnson Kindness PLLC (57) ABSTRACT

A portable storage container (10) having a base shell (12) and cover shell (14) is disclosed. The shells (12) and (14) are planar and generally circular in shape with the exception of a spine (16) spanning between and integrally joining the base and cover shells (12) and (14). Disc shaped recesses (16) and (18) in combination with tine type gripping components (20) and (22) grip a compact disc within each base and cover shell (12) and (14). A groove (48) located equidistant between the centers of the shells (12) and (14) on the spine (16) forms a live hinge. The cover shell (14) may be bent towards the base shell (12), encasing the compact discs held in the disc shaped recess (16) and (18) of the shells (12) and (14). A locking mechanism maintains the storage container 10 in the closed position until opened by the user. Two tabs (36) with apertures (38) allow the storage container (10) to be removably mounted in a ring binder. When the apertures (38) are not in use, they may be bent back and stored on two cylindrical structures (40) by a friction or a snap fit, protecting them from damage.

12 Claims, 4 Drawing Sheets

U.S. PATENT DOCUMENTS

| | | | |
|---|---|---|---|
| 5,634,559 A | | 6/1997 | Foos et al. |
| D383,936 S | | 9/1997 | McCracken |
| 5,682,992 A | | 11/1997 | Hunt et al. |
| D387,217 S | | 12/1997 | Lakoski et al. |
| 5,695,054 A | * | 12/1997 | Weisburn et al. ........ 206/308.1 |
| 5,697,498 A | | 12/1997 | Weisburn et al. |
| 5,713,463 A | | 2/1998 | Lakoski et al. |
| 5,715,938 A | | 2/1998 | Cheris et al. |
| 5,720,384 A | | 2/1998 | Wu-Chen |
| D391,437 S | | 3/1998 | Moore et al. |
| 5,782,352 A | | 7/1998 | Senda |
| D398,842 S | | 9/1998 | Rohrig |
| 5,826,717 A | * | 10/1998 | Eskandry ................. 206/308.1 |
| D401,463 S | | 11/1998 | Cheris et al. |
| 5,829,583 A | | 11/1998 | VerWeyst et al. |
| D406,719 S | | 3/1999 | Clausen |
| 5,878,878 A | | 3/1999 | Wu |
| 5,882,748 A | | 3/1999 | Tomoda |
| D408,202 S | | 4/1999 | Jacobson |
| D408,678 S | | 4/1999 | Williams et al. |
| D413,753 S | | 9/1999 | Allsop |
| D414,977 S | | 10/1999 | Hales et al. |
| 6,021,894 A | | 2/2000 | Lakoski et al. |
| D431,956 S | | 10/2000 | Chouraqui et al. |
| D433,265 S | | 11/2000 | Khatemi |
| D434,592 S | | 12/2000 | Sankey et al. |
| 6,179,121 B1 | * | 1/2001 | Ferguson et al. ........... 206/311 |
| 6,216,862 B1 | | 4/2001 | Chang |
| D441,590 S | | 5/2001 | Hartstone |
| 6,247,587 B1 | | 6/2001 | Yu |

* cited by examiner

COMPACT DISC CARRYING CONTAINER

CROSS REFERENCE TO RELATED APPLICATION

This application claims the benefit under 35 U.S.C. §119 (e) of U.S. Provisional Patent Application Serial No. 60/227,430, filed Aug. 23, 2000, the disclosure of which is hereby expressly incorporated by reference.

FIELD OF THE INVENTION

The present invention relates generally to storage containers and, more particularly, to portable storage containers adapted to protectively store compact discs.

BACKGROUND OF THE INVENTION

Compact discs provide a medium upon which digital data can be stored. A laser beam is utilized to read the stored data and provide an accurate reproduction of the original input to a user device, such as a stereo system or personal computer. Compact discs are typically planar discs having a concentric central aperture which facilitates the precision mounting of the compact discs in reading devices. The compact discs are rotated as the laser reads from the compact disc. The laser's ability to accurately retrieve the data encoded on the compact disc is diminished by the presence of dust and scratches upon the compact disc surface, which may scatter the laser beam. Therefore, it is desirable to store compact discs in protective containers to inhibit the accumulation of dust and prevent the scratching of the disk surface.

The carrying containers commonly available have a two piece shell that includes a generally planar cover shell member and a base shell member. The two members are hingedly attached to one another along one edge of the member, often by a shaft and receiving cylinder arrangement. A locking mechanism is provided for releasably locking the shells together in the closed position. The base shell is typically provided with a tray for receiving and holding the compact disc in a stationary position relative to the shells. The base shell may have an engagement device for engaging the central aperture of the compact disc. A common engagement device comprises a tine defined by a plurality of tines raised in a circle, dimensioned to provide an interference fit with the central aperture of the compact disc. Although existing compact disc carrying containers are effective at storing compact discs in a manner that generally serves to preserve the laser's ability to accurately retrieve the stored data, they are not without problems.

First, well known carrying containers include three separate pieces. This is undesirable because the manufacturing process is complicated by the necessity of forming three distinct parts separately and subsequently assembling the parts to form a final product, increasing manufacturing costs and times. Second, there is no means provided for resiliently biasing the cover and base shell apart, so that when the locking shell is released, the cover and base shells spring apart, opening the carrying container without the user applying a separating force. Or in the alternative, if resilient biasing of the shells is provided, it is accomplished through the attachment of additional parts such as springs. Third, the carrying container does not comprise attachment structures for removably attaching the carrying container upon or within a second larger storage container used to store a plurality of compact disc storage containers. Therefore, inasmuch as no securing devices are provided, securely attaching the compact disc storage containers in a secondary storage container is complicated. Finally, compact disc containers are typically constructed in a rectangular configuration of a brittle plastic which is highly susceptible to damage when impacted, such as occurs when dropped.

Thus, there exists a need for a compact disc carrying container that protects compact discs from the accumulation of dust, debris, and scratches, can be formed as one piece, is formed from an impact resistant material to aid in reducing impact damage, where the two shell halves are resiliently biased so as to spring open upon release of the locking mechanism, and that has retractable attachment structures for removably attaching the storage container within a secondary storage container.

SUMMARY OF THE INVENTION

In accordance with one embodiment of the present invention, a storage container is provided. The storage container includes first and second receptacles, at least one of the receptacles being sized to receive an item for storage. The storage container also includes a hinge member extending between the first and second receptacles for reciprocal movement of the storage container between an open position and a closed position. An attachment member extends from the hinge member and is adapted to removably couple the storage container to a binder.

In accordance with an aspect of the present embodiment, the attachment member is flexibly formed with the hinge member for reciprocating movement between a stored position and an extended position for coupling attachments to the binder. In accordance with yet another aspect of this embodiment, the attachment member includes a peg formed with the hinge member and a tab hingedly attached to the hinge member, wherein the tab includes an aperture extending therethrough and positioned for locking engagement with the peg when the attachment member is in the stored position.

In accordance with still yet another aspect of this embodiment, the attachment member includes first and second bores extending through the hinge member, wherein the first and second bores are a pair of cut-outs adapted for coupling engagement to the binder when the storage container is in the closed position.

A storage container formed in accordance with the present invention has several advantages over currently available storage containers. The one-piece design of the storage container allows for reduce manufacturing costs since the storage container requires no assembly of separate parts and may be manufactured in one step through an ejection molding process. In addition, the one piece design of the storage containers allows for the manufacturing process to resiliently bias the shells respective to one another and the tabs relative to the cylindrical receiving structures, so that when the cover shell or tab is released from the corresponding other member, they spring open, without the use of additional parts such as springs. Further, the ability of the tabs to be retracted and secured in a retracted position is advantageous for it substantially reduces the chance of physical damage to these vulnerable structures when not in use. The rounded design and use of resilient materials provides a storage container highly resistant to impact damage.

Thus, a storage container formed in accordance with the embodiments of the present invention is effective in protecting the contents from the accumulation of dust and debris and physical damage to the container and contents, is economical to produce, is resiliently biased so as to spring open upon release of the locking mechanism without additional parts, is easy to operate, and is less likely to sustain physical damage to its attachment structures since they be retracted when not in use.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
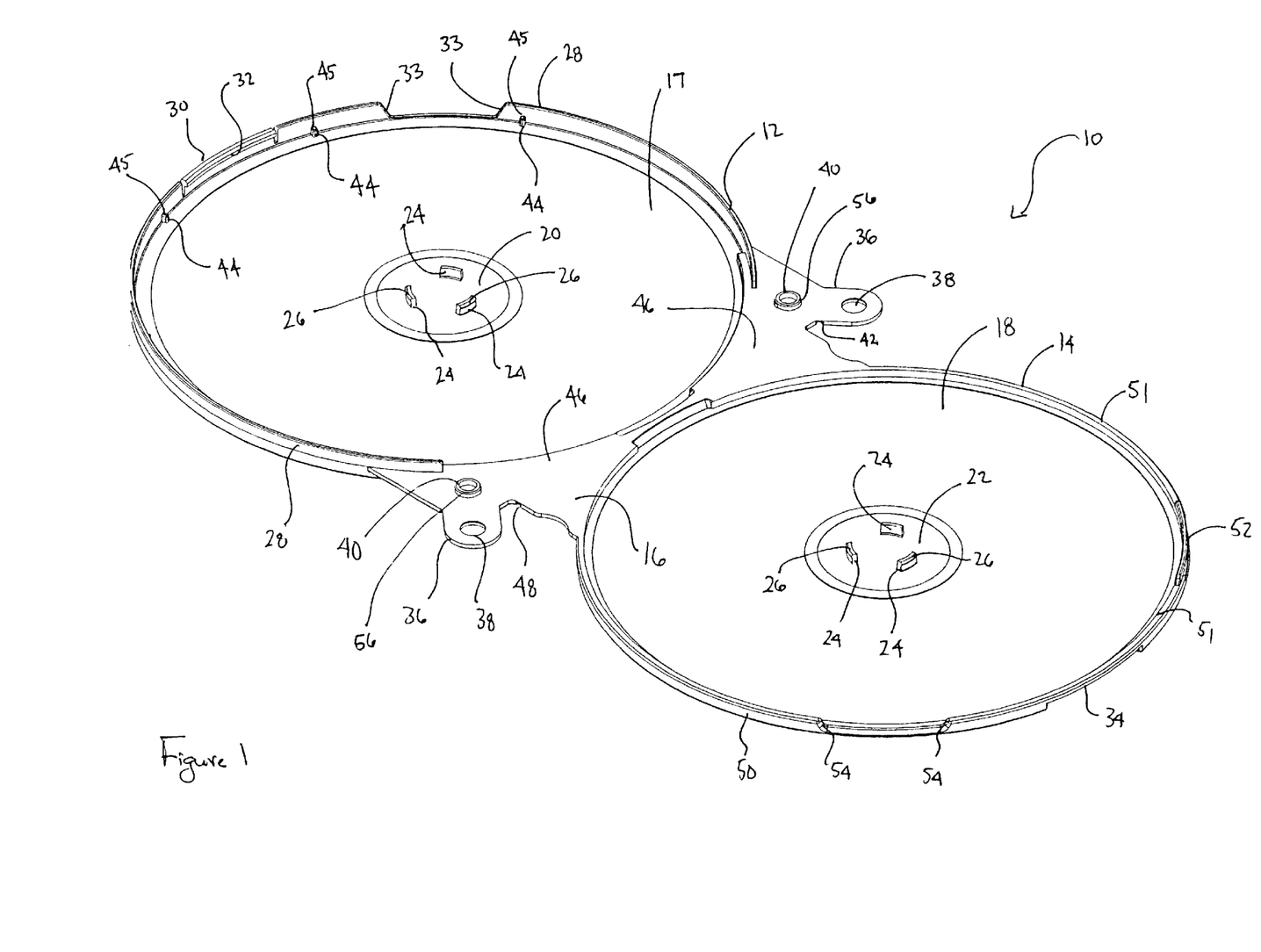
FIG. 1 is a perspective view of a storage container formed in accordance with one embodiment of the present invention shown in the fully open position with the tabs extended.

FIGS. 1–4 illustrate one embodiment of a storage container 10 constructed in accordance with the present invention. Referring now to FIG. 1, the storage container 10 is designed to be used in conjunction with at least one compact disc, preferably dimensioned in accordance with industry standards. Although the compact disk is not necessarily a part of the present invention, and therefore for ease of illustration has been omitted from the drawings, parts of the storage container 10 will be explained with reference to a compact disk being located within or removed from the storage container 10.

Briefly described, the storage container 10 includes a base receptacle or shell 12 and a cover receptacle or shell 14. The base and cover shells 12 and 14 are planar and generally circular in shape with the exception of a spine or web 16 spanning between and integrally joining the base and cover shells 12 and 14. The base and cover shells 12 and 14 are configured with centrally positioned disc shaped recesses 17 and 18 respectively, for receiving a compact disc. The disc shaped recesses 17 and 18 are preferably configured and sized so as to fittingly receive the compact disc. In the preferred embodiment, centrally disposed tine type gripping components 20 and 22 extend integrally and in a substantially upward direction from the recesses 17 and 18 in each base and cover shell 12 and 14 respectively. The gripping components 20 and 22 contain a plurality of tines 24 having outward protruding lips 26. The tines 24 are dimensionally positioned so that they provide a friction interference fit in relation to the inner edge of the concentric central aperture of a compact disc (not shown). The tines 24 of the base shell 12 are positioned along the imaginary circle that contains the tines so that when the storage container is closed, the tines of the base shell 12 will be indexed with the valleys between the tines of the upper shell 14, thereby avoiding any interference between tines 24 of the respective shells. Although a tine type gripping components 20 and 22 are shown, the invention should not be so limited as it may include other means of removably mounting the disc in the container 10 or the compact disc may simply be set in the recess without the use of gripping components.

The base shell 12 is formed integral with the cover shell 14, having been formed as one piece during an injection molding manufacturing process. The base shell 12 and the cover shell 14, in their natural unstressed positions, are coplanar relative to each other, as depicted in FIG. 1. As such, they provide a resistance to bending from their original coplanar configuration to that of the closed position depicted in FIG. 4. However, this resistance to bending can be overcome by slight finger pressure. The shells 12 and 14 are preferably formed by injection molding of a malleable polypropylene material that is capable of flexing thousands of times without failure. Although a polypropylene material was used in the preferred embodiment, it is apparent to one skilled in the art that other suitable materials may be utilized in accordance with this invention. Further, in the preferred embodiment, a translucent material was utilized to enable the user to visually determine the contents of the storage container 10, nevertheless a material of any color is within the scope of the invention.

Figure 4:
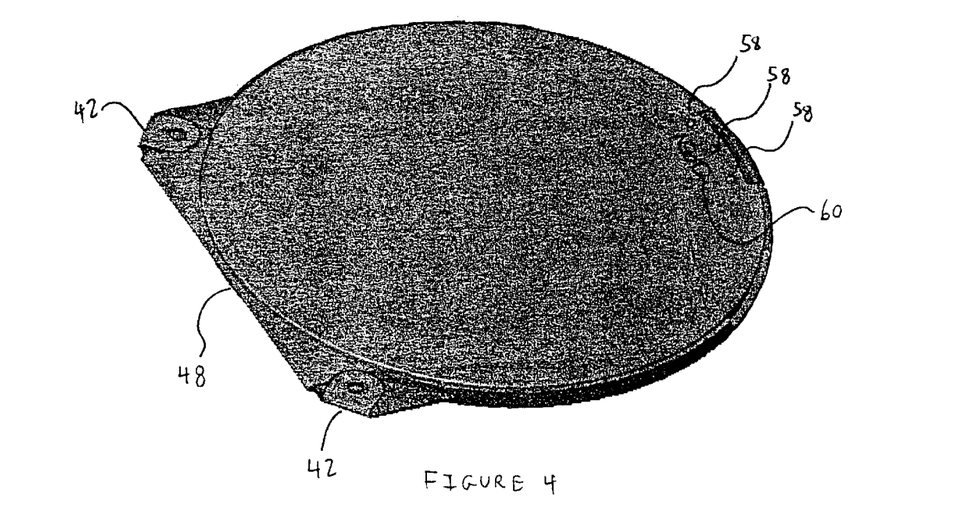
FIG. 4 is a perspective view of a storage container formed in accordance with one embodiment of the present invention shown in the closed position with the tabs retracted.

Located substantially equidistant between the center of the base shell 12 and the cover shell 14 is an elongated groove 48, as best shown in FIG. 4, oriented perpendicular to an imaginary line that intersects the center of the base shell 12 and the cover shell 14. The groove 48 forms a live hinge between the shells 12 and 14 so that the cover shell 14 may be bent inward towards the center of the base shell 12, closing the storage container.

The base shell 12 is formed with a perpendicularly extending peripherally located wall 28. The wall 28 is circular in shape, having an inner diameter slightly larger than or equal to the outer most diameter of the similar peripherally located wall 50 of the cover shell 14. A segment of the wall 28 is cut-out forming opposing wall edges 33. Removal of the wall between the wall edges 33 allows the user to grip the outer surface of cover shell 14 while the storage container 10 is in the closed position. Further, removal of the wall between edges 33 allows the user to grip the outer edge of a compact disc while the disc occupies the disc shaped recess 17 of base shell 12 to aid in its removal from the tine-type gripping component 20.

Located adjacent to the inner surface of the wall 28 are a plurality of rectangular structures 44 spaced intermittently along the wall's inner perimeter. The rectangular structures 44 act as travel limit stops preventing the compact disc removably mounted in the cover shell 14 from compressing against the compact disc removably mounted in the base shell 12. Movement of the cover shell 14 is limited with respect to the base shell 12 when the upper most edge 51 of the cover shell wall 50 contacts the horizontal upper surface 45 of the rectangular structures 44.

The spine 16 extends into the disc spaced recess portion 17 forming further travel limiting structures 46. As in the rectangular shaped structures 44 described above, structures 46 act as a travel limit to reduce the risk of one compact disc removably mounted in the cover shell 14 from compressing against a different compact disc removably mounted in the base shell 12. Movement of the cover shell 14 is limited with respect to the base shell 12 when the upper most edge 51 of the cover shell wall 50 contacts the horizontal upper surface of the travel limiting structures 46.

Base shell 12 further includes a locking tine member 30 for releasably locking the cover shell 14 to the base shell 12 while in the closed position. The perpendicularly oriented locking tine member 30 has an inward protruding lip 32 that extends integrally from the inner facing surface of the locking tine member 30. The locking tine member 30 is adapted to cooperate with a recess portion 34 located in the outer peripheral edge of the cover shell 14 for releasably locking the cover shell 14 in a closed position relative to the base shell 12.

The cover shell 14 is similarly configured as to the base shell 12 with the following exceptions. The cover shell 12 is formed with a perpendicularly extending peripherally located wall 50. The wall 50 is circular in shape, having an inner diameter slightly larger than the outer most diameter of a compact disc and an outer diameter slightly less or equal to the inner diameter of the base shell wall 28. A segment of the wall 50 is cut-out, forming opposing wall edges 52. Removal of the wall between the wall edges 52 allows the user to grip the outer edge of a compact disc (when the storage container 10 is in the open position) while the disc occupies the disc shaped recess 18 of cover shell 14, to aid in its removal from the tine-type gripping component 22 of the cover shell 14.

The peripherally located wall 50 is extended in height along a segment of the wall to create a raised wall portion 52. The height of the raised wall portion is selected to correspond with the desired separation distance between the inner surfaces of the disc shaped recesses 17 and 18 of the shells 12 and 14, respectively. The raised wall portion 52 is indexed with the section of wall cut-out from the peripheral wall 28 of the base shell 12, situated between wall edges 33. The raised wall portion 52 therefore serves to also block contaminates from entering the container through the space between wall edges 33 when the storage container 10 is in the closed position. Further, the raised wall portion 52 serves as a travel limit stop to maintain the proper spacing between compact discs removably mounted in the recess disc portions 17 and 18 of the base and cover shells 12 and 14, respectively.

Cover shell 14 further comprises a recess portion 34 along wall 50. The locking tine member 30 is adapted to cooperate with the recess portion 34 located along the outer peripheral edge of the cover shell 14 for releasably locking the cover shell 14 in a closed position. In operation, the recess portion 34 receives the inward protruding lip 32 of the locking tine member 30, releasably locking the cover shell 14 to the base shell 12 while in the closed position. By bending the locking tine member 30 outward, the protruding lip 32 is disengaged from the recess portion 34 along wall 50 and the cover shell 14 springs away from the base shell 12 as it attempts to return to its original coplanar shape, opening the storage container 10 for user access.

To aid in the operation of the storage container 10, grooves, lines, or other markings are provided to enhance grip and to communicate with the user. Although not limiting, bumps 58 are provided adjacent to recess portion 34 on the outer surface of the cover shell 12 to provide enhanced grip and to communicate to the user through tactile stimulus the correct position of the fingers during opening and closing of the storage container 10. In the same location as the bumps 58, is raised lettering 60, also providing enhanced grip, a tactile stimulus, and further communicating to the user by spelling the word "OPEN", indicating to the user where the locking tine member 30 of the base shell 12 can be found to disengage the lip 32 from the recess portion 34 in the cover shell 14, thus opening the storage container 10.

The spine 16 of the base shell 12 also includes attachment members comprising tabs 36 with centrally located apertures 38. The apertures 38 are horizontally spaced from one another, and diametrically dimensioned to accept the rings of a common three ring binder (not shown). The tabs 36 are positioned in an angle relative to the centerline of the spine, such that when the tabs 36 are folded flat, the dimension between the holes in each tabs 36 corresponds to the distance between rings of common three ring binders. Although the apertures 38 in the preferred embodiment depicted are spaced so as to coincide with the spacing of rings of three ring binders commonly sold in the US market place, the spacing of the apertures 38 may be varied to coincide with other standard or custom ring spacings, such as two ring binders, or diameters.

Also situated on the spine 16 of the base shell 12 in proximity to the tabs 36 are two cylindrical structures 40 oriented perpendicular to the planar base shell 12 surface. The cylindrical structures 40 or pegs have an outer diameter chosen to provide an interference fit in relation to the inner diameter of the apertures 38 of the tabs 36. The two cylindrical structures each have a protruding lip 56 which extends radially outward from the outer surface of the cylindrical structures 40. The protruding lip 56 extends outward along approximately 20% of the circumference of the cylindrical structures 40 along the side of the structures 40 opposite of the apertures 38. The protruding lip 56 is oriented on the cylindrical structures so that it would be dissected through its center by a line extending from the center of the aperture 38 through the center of the cylindrical structure 40.

Located substantially equidistant between the apertures 38 and the cylindrical structures 40 are grooves 42, as best shown in FIG. 4, oriented perpendicular to imaginary lines that intersect the center of the base shell 12 and the apertures 38. The grooves 42 form a live hinge between the apertures 38 and the cylindrical structures 40 so that the tabs 36 may be bent inward towards the center of the base shell 14. When so bent, the apertures 38 may be pressed on the cylindrical structures 40, removably securing the tabs 36 to the cylindrical structures 40 by an interference fit.

The tabs 36 are suitably integral with the base shell 12 having been formed as one piece during the manufacturing process. The tabs 36 and the base shell 12, in their natural unstressed positions, are coplanar relative to each other, as depicted in FIG. 1. As such, they provide a resistance to bending from the original planar configuration to that of the retracted position described above. This resistance to bending may be overcome by the application of slight finger pressure. The tabs 36 are formed of a malleable polypropylene material that is capable of flexing thousands of times without failure. Although a polypropylene material was used in the preferred embodiment, it is apparent to one skilled in the art that other suitable materials can be utilized in accordance with this invention.

Figure 2:
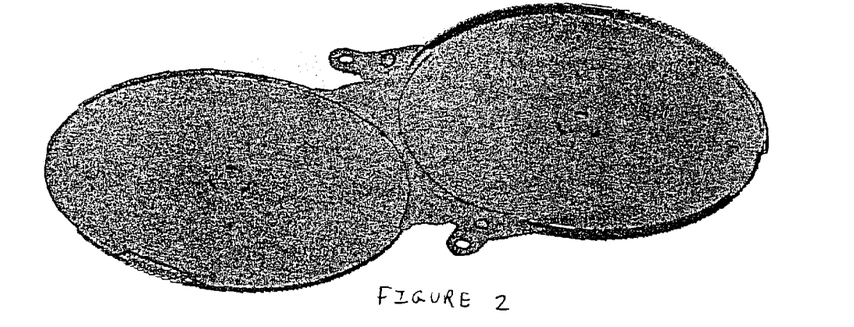
FIG. 2 is a perspective view of a storage container formed in accordance with one embodiment of the present invention shown in the fully open position with the tabs extended.
Figure 3:
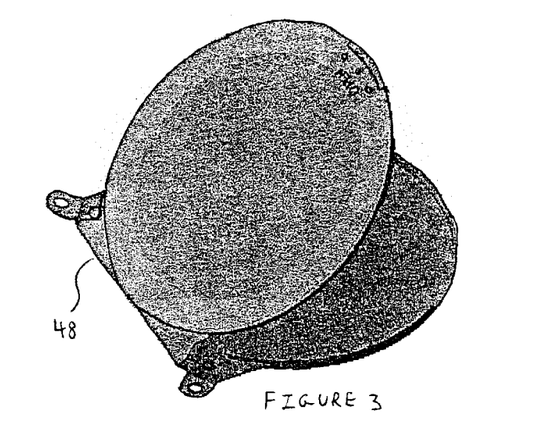
FIG. 3 is a perspective view of a storage container formed in accordance with one embodiment of the present invention shown in the partially open position with the tabs extended.

In operation, the user may selectively position the tabs 36 in either a retracted position, as shown in FIG. 4, or in an extended position as shown in FIGS. 1 and 2. The user may selectively position the tabs to coincide with the user's desire to use the storage container 10 in combination with a ring binder or other storage container where attachment means are necessary. When not used in combination with a ring binder or other type of storage container, the tabs 36 may be retracted as described above to protect them from damage.

Although in the preferred embodiment bendable tabs 36 were described for attaching structures, solid non-bending tabs may also be used. For example, the spine 16 may also be formed with non-bendable tabs by removing groove 42, thereby eliminating the retractability of the tabs but simplifying the design. In addition, the spine 16 can be formed as a solid piece with attachment members integrally formed therewith for accepting the rings of a binder. This embodiment may be best seen by referring to FIGS. 5 and 6. These figures illustrate a storage container 110 formed in accordance with an alternate embodiment of the present invention. The storage container 110 is identical in materials, configuration and operation as the preferred embodiment described above with the exception that the storage container 110 includes identically configured attachment members 140*a* and 140*b*. The attachment members are suitably integrally formed with the spine 116 of the storage container 110. During the manufacturing process, the spine 116 is drilled at suitable locations to provide the attachment members 136*a* and 136*b* for accepting the rings of a binder.

Figure 5:
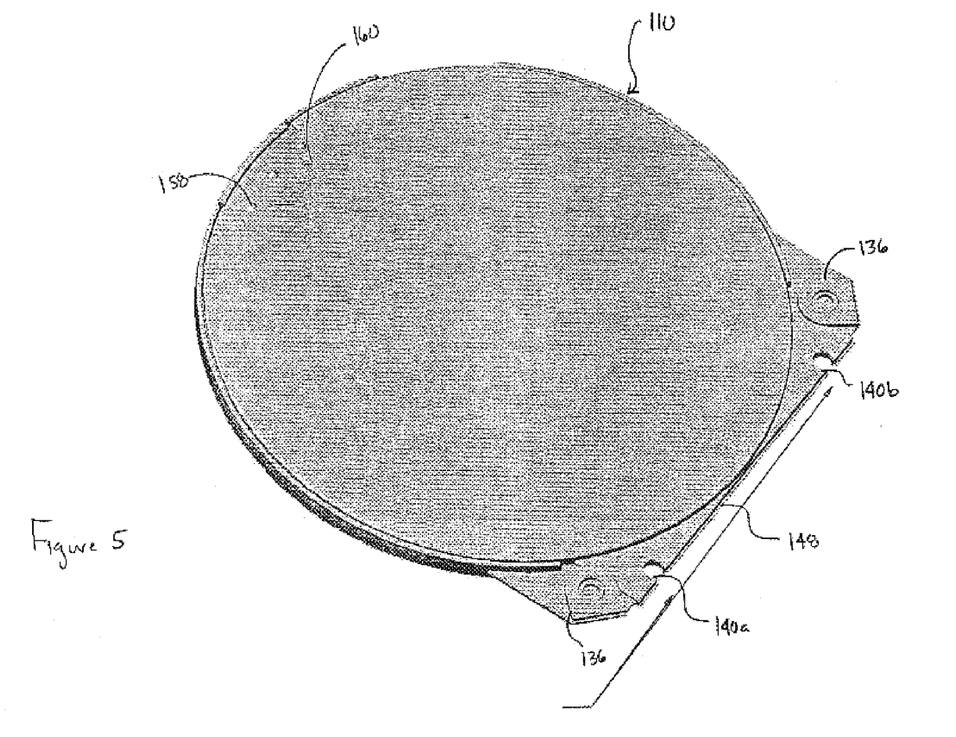
FIG. 5 is a perspective view of a storage container formed in accordance with an alternate embodiment of the present invention, showing the storage container in a closed position.
Figure 6:
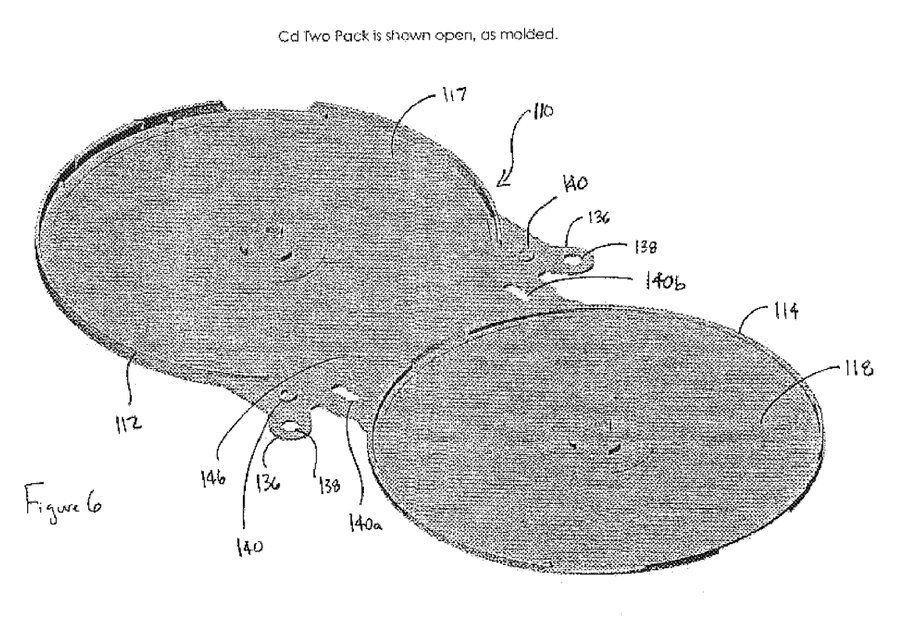
FIG. 6 is a perspective view of the storage container of FIG. 5, showing the storage container in an open position.

As seen best by referring to FIG. 5, when the storage container 110 is in the closed position, the attachment members 140*a* and 140*b* are two cut-outs positioned to be releasably snapped onto correspondingly located rings of a well known binder or desk top stand. Although the storage container is illustrated as including both tabs 136 and attachment members 140*a* and 140*b*, other configurations, such as a storage container that includes only attachment members, are also within the scope of the present invention.

Further, although only two apertures were depicted in the preferred embodiment for ease of illustration, the invention may utilize multiple apertures to accept a plurality of varying ring spacings. In addition, although apertures were described as attaching structures in the preferred embodiment, other attaching structures are also suitable that are well known by those skilled in the art. Still further, although the preferred embodiment of the storage container 10 is described as designed for storing compact discs, the storage container may also be used for other materials requiring protection from contaminate or physical damage. Finally, a storage container 10 formed in accordance with the present invention may also be formed with a single tab, or the container may include two or more tabs and the user may choose to use only one of the tabs to attach the container to a binder.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A compact disc storage container, comprising:
   (a) first and second receptacles, at least one of the receptacles being sized to receive a compact disc for storage, said at least one receptacle including projecting structure for engaging the central opening of a compact disc;
   (b) a web integrally formed with and extending between the first and second receptacles and comprising a hinge for reciprocal movement of the storage container between an open and closed position; and
   (c) an attachment member comprising a tab integral with and extending from said web and including an aperture therein, said attachment member adapted to removably couple the storage container to a binder ring when the storage container is in the closed position.

2. The compact disc storage container of claim 1, wherein the attachment member comprises a second tab, said first and second tabs flexibly formed with the web for reciprocating movement between a stored position and an extended position for coupling attachment to a ring binder.

3. The compact disc storage container of claim 2, wherein the web includes first and second pegs connected thereto, said second tab including an aperture extending therethrough and said and first second tabs being positioned for locking engagement with said first and second pegs when said tabs are in the stored position.

4. The compact disc storage container of claim 1, wherein the attachment member comprises at least a first cutout extending through the web and adapted for coupling engagement to the binder ring when the storage container is in the closed position.

5. The compact disc storage container of claim 1, wherein the attachment member comprises first and second cutouts extending through the web, said cutouts being adapted for coupling engagement to two rings of a binder when the storage container is in the closed position.

6. A one piece molded compact disc storage container, comprising:
   (a) first and second receptacles, each receptacle being sized to receive compact disc for storage each receptacle including projecting structure for engaging the central opening of a compact disc;
   (b) a flexible web integrally formed with and extending between the first and second receptacles and comprising a live hinge for reciprocal movement of the storage container between an open and closed position; and
   (c) attachment means comprising first and second tabs extending from the hinge member and including apertures therein for removably coupling the compact disc storage container to a binder when the storage container is in the closed position.

7. The storage container of claim 6, wherein the first and second tabs are integrally formed with the web for reciprocating movement between a stored position and an extended position for coupling attachment to a ring binder.

8. The storage container of claim 8, wherein the web includes first and second pegs formed integral therewith and said first and second tabs each including an aperture extending therethrough and positioned for locking engagement with a peg when the attachment member is in the stored position.

9. The compact disc storage container of claim 6, wherein the attachment means comprises at least a first bore extending through the hinge member, wherein the first bore is a cutout adapted for coupling engagement to the binder when the storage container is in the closed position.

10. The compact disc storage container of claim 6, wherein the attachment means comprises first and second bores extending through the hinge member, wherein the first and second bores are a pair of cutouts adapted for coupling engagement to the binder when the storage container is in the closed position.

11. A compact disc storage container, comprising:
   (a) first and second receptacles, at least one of the receptacles being sized to receive a compact disc for storage, said at least one receptacle including projecting structure for engaging the central opening of a compact disc;
   (b) a web extending between the first and second receptacles and comprising a hinge for reciprocal movement of the compact disc storage container between an open and closed position; and
   (c) a ring binder attachment cutout integrally formed in the web and adapted to removably couple the compact disc storage container to the ring of a ring binder when the compact disc storage container is in the closed position.

12. The compact disc storage container of claim 13, further comprising a second ring binder attachment cutout integrally formed in the web and spaced from the first ring binder attachment cutout for coupling engagement of the container to two rings of a ring binder.

* * * * *

UNITED STATES PATENT AND TRADEMARK OFFICE
CERTIFICATE OF CORRECTION

PATENT NO. : 6,749,061 B1
DATED : June 15, 2004
INVENTOR(S) : E. Clausen

Page 1 of 1

It is certified that error appears in the above-identified patent and that said Letters Patent is hereby corrected as shown below:

<u>Column 8,</u>
Line 22, "receive compact" should read -- receive a compact --
Line 22, "storage each" should read -- storage, each --
Lines 35 and 39, "The storage container" should read -- The compact disc storage container --
Line 39, "claim 8," should read -- claim 7, --

<u>Column 9,</u>
Line 4, "claim 13," should read -- claim 11, --

Signed and Sealed this

Twenty-first Day of December, 2004

JON W. DUDAS
*Director of the United States Patent and Trademark Office*

UNITED STATES PATENT AND TRADEMARK OFFICE
CERTIFICATE OF CORRECTION

PATENT NO.   : 6,749,061 B2
DATED        : June 15, 2004
INVENTOR(S)  : E. Clausen It is certified that error appears in the above-identified patent and that said Letters Patent is hereby corrected as shown below:

<u>Title page,</u>
Item [10], Patent No, "6,749,061 B1" should read -- 6,749,061 B2 --

Signed and Sealed this

Tenth Day of May, 2005

JON W. DUDAS
*Director of the United States Patent and Trademark Office*